United States Patent Office 3,335,833
Patented Aug. 15, 1967

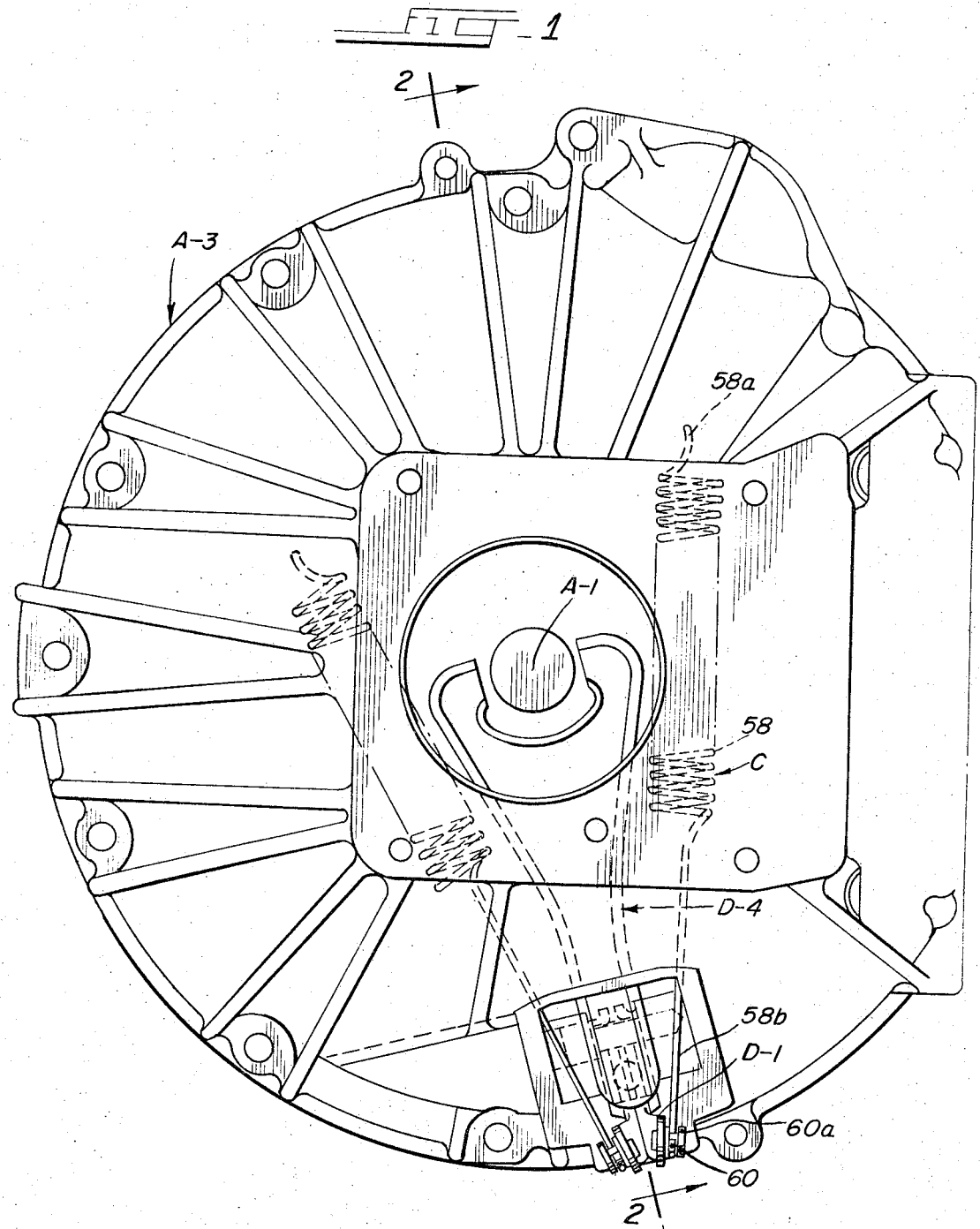

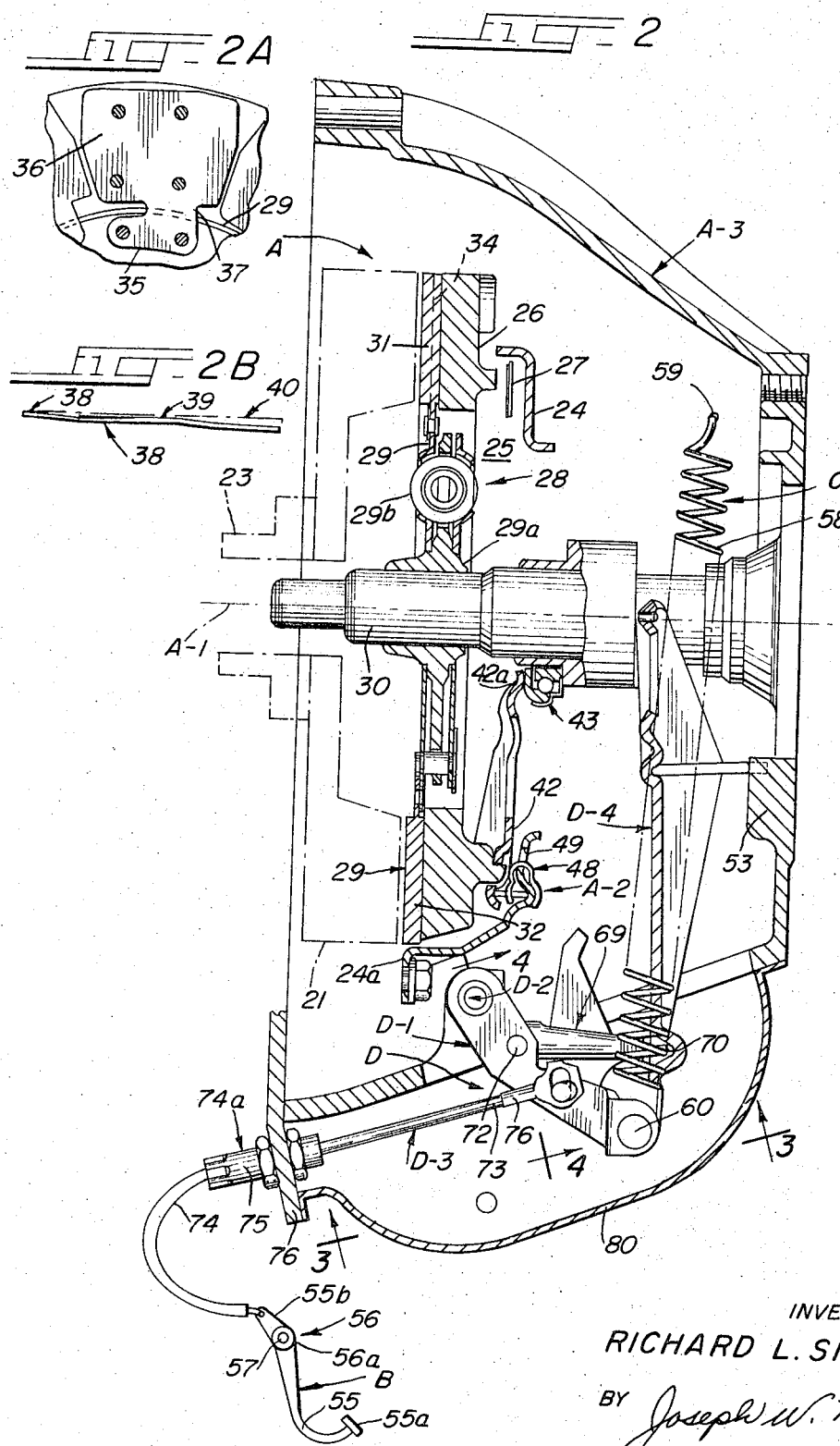

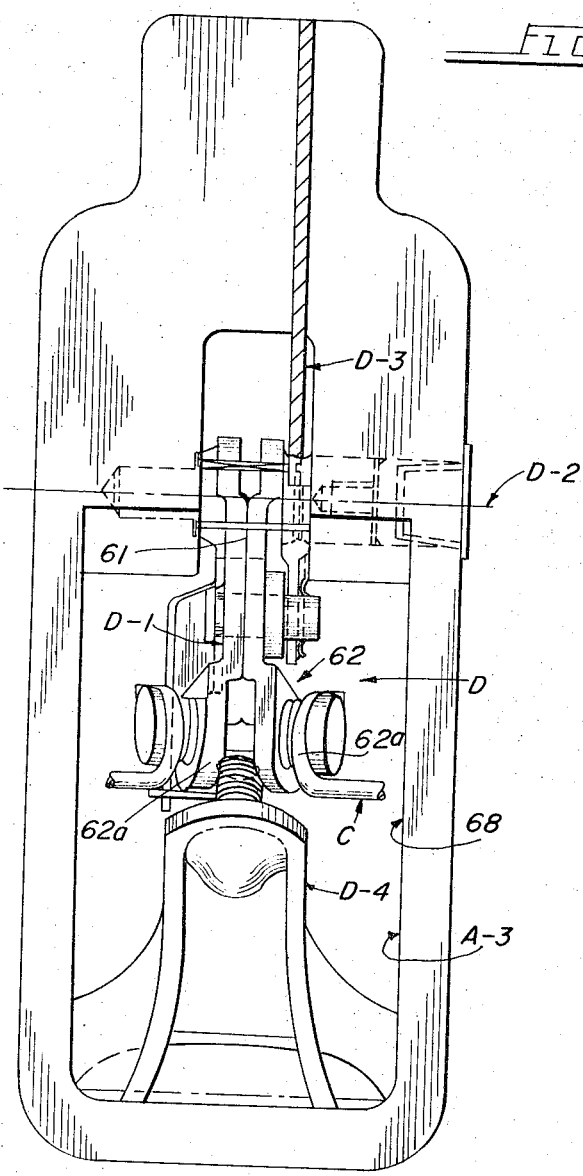
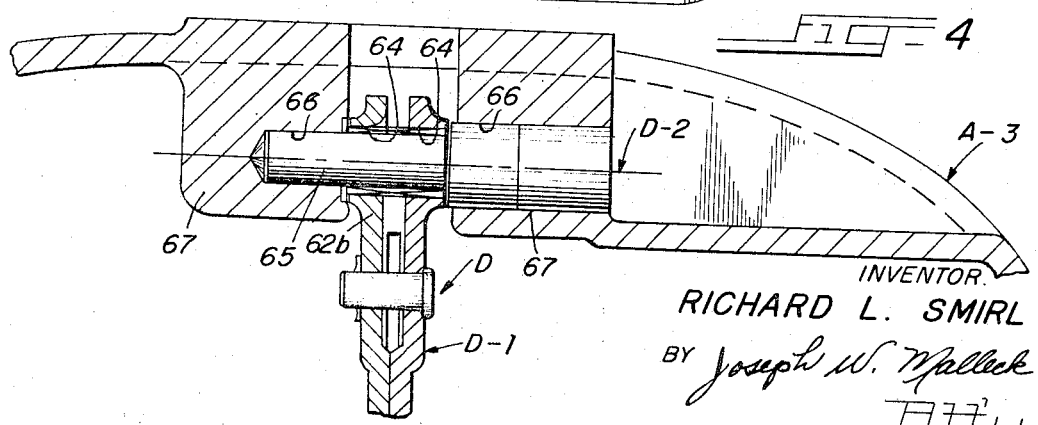

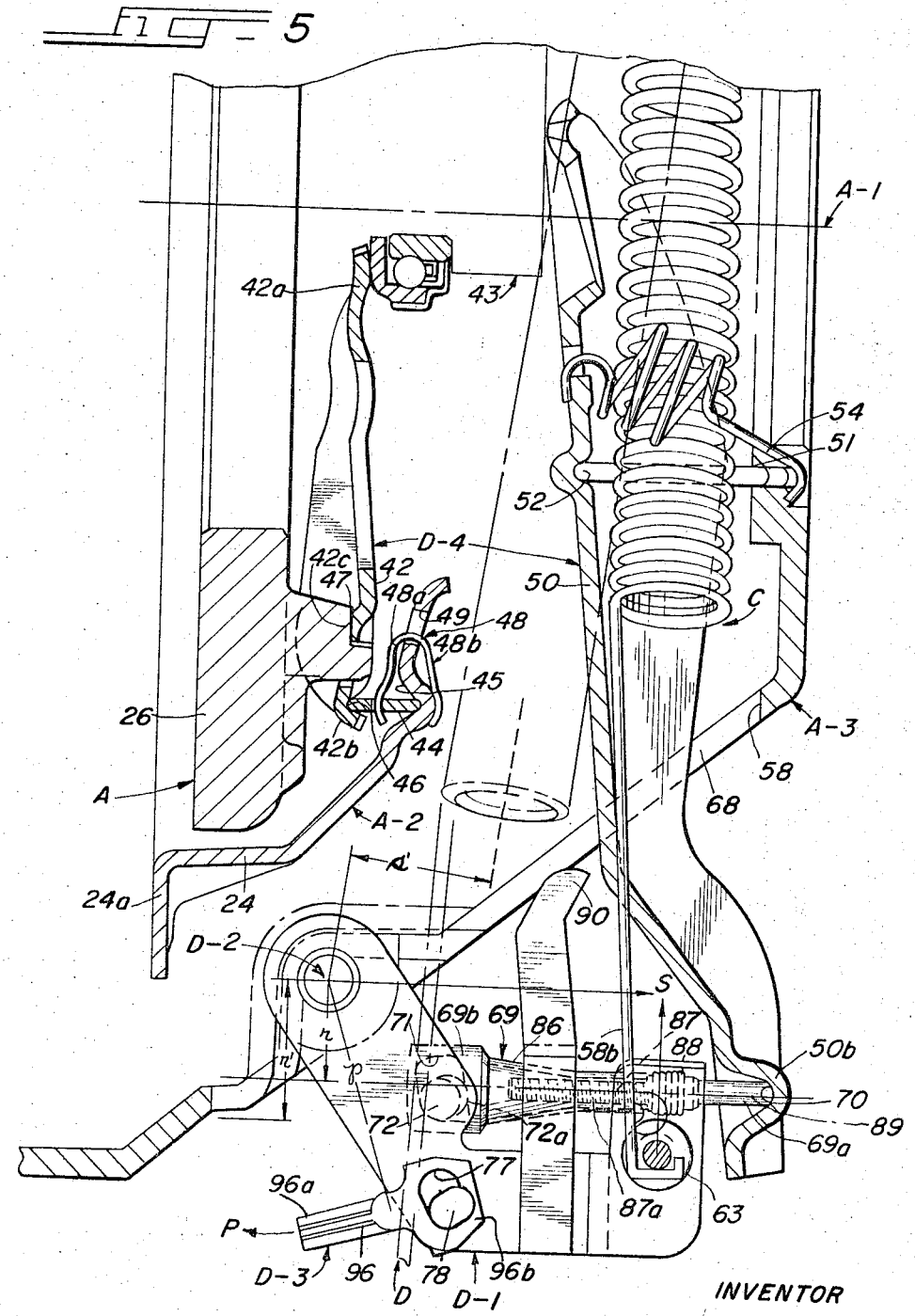

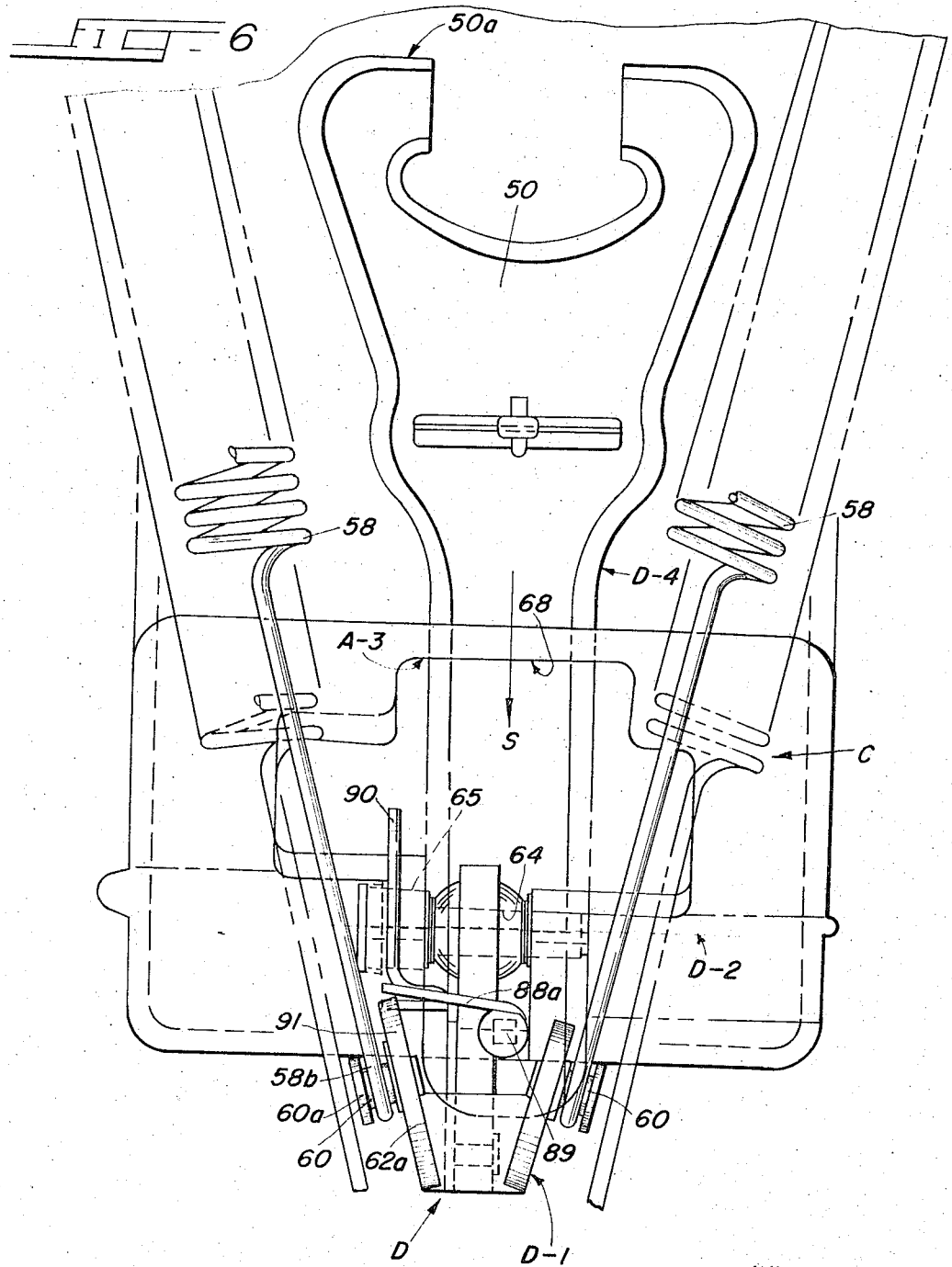

3,335,833
ROTARY FRICTION COUPLING EMPLOYING TRANSVERSE ENGAGING SPRINGS
Richard L. Smirl, La Grange, Ill., assignor to Borg-Warner Corporation, Chicago, Ill., a corporation of Illinois
Filed Dec. 8, 1965, Ser. No. 512,442
4 Claims. (Cl. 192—68)

ABSTRACT OF THE DISCLOSURE

A disc clutch of the axially engageable type and having remote engaging springs which are disposed internally within the clutch housing and extend traversely with respect to the axis of rotation of the clutching mechanism; the release structure comprises a common rocker arm having one end pivotally mounted on the clutch housing, a flexible cable link interconnecting with a clutch release pedal and secured to an intermediate portion of said rocker arm, and the traverse engaging springs being connected to the outer extremity of said rocker arm; the points of connection of said springs and release cable being predetermined so as to have turning moments about the rocker arm pivot which substantially reduces the clutch release effort.

---

This invention relates to friction mechanisms and more particularly to an improved friction clutch system employing resilient engaging springs which are non-direct in their action upon clutch pressure plate.

Until the present time, substantially all vehicles have used conventional clutches of the type wherein a pressure plate load resulted from the use of several coil springs or a diaphragm spring acting directly on a pressure plate; the springs were consistently disposed in a position acting between a cover plate and the pressure plate. In a remote or indirect spring clutch, the clutch engaging force is mechanically transmitted through a linkage to apply force to the pressure plate. Although the advantages of an indirect or remote spring type clutch have been known for some time, there has been continuous resistance to employing such clutches on vehicles because of resulting uncomfortable clutch pedal effort, the difficulty of protecting the remote elements of the system and accommodating such elements in an easily installed package having the least amount of space.

It is accordingly a primary object of this invention to provide an improved friction clutch system of the type having axially engageable friction elements, the system being characterized by a more comfortable pedal effort without sacrificing durability of the device or compactness of arrangement. Structural features pursuant to this object is the provision of a common pivotal arm (formed of double ply sheet metal) carried by the clutch housing and to which is connected each: a manual means, resilient means, and clutching means; the various means are more precisely coordinated in their geometrical relationship as they move from an engaged to a disengaged condition of the device. The resilient means may have a plurality of helically coiled tension springs disposed on chords of a circle inscribing the housing of the clutch and each having one end connected to the clutch housing and an opposite end to the common pivotal arm in a manner so that the resultant resilient force acts along a direction which passes through or adjacent the axis of rotation of the clutching device thereby permitting the springs to be placed closely adjacent the clutching means. The linkage connecting the clutching means to the common arm is characterized by the disposition of the last link in a manner to direct the reaction force from the driven plate cushions substantially parallel to the axis of the clutch device whereby as the pivot arm moves arcuately the moment arm of clutch reaction force will be continuously increasing and more particularly will be increasing during the stage when the device most closely approaches the disengaged condition. The axis for the arm pivot may be disposed so that it is closely adjacent the outer periphery of the pressure element while off-set perpendicular to a plane passing through the rotary axis of the device.

Other structural features may comprise the provision of a wear adjuster which may be integrally formed as the last link of the transmitting means connecting the clutching means to the pivotal arm; the provision of a lever system, forming part of the force transmitting means between the clutching means and the rocker arm, and which is characterized by rockable or rollable contact points throughout; an improved retention means for struts, which form part of the rollable or rocking connection of said lever system may be employed; and special connectors having D-shaped openings and cooperating pins rollable along the straight edge of such D-shaped openings may be incorporated.

Other objects and advantages of this invention will become more apparent from the following detailed description taken in connection with the accompanying drawings in which:

FIGURE 1 is an elevational view of a structure embodying the principles of this invention and illustrating certain portions in phantom outline contained therein;

FIGURE 2 is a central section taken substantially along line 2—2 of FIGURE 1 and showing one position of the force transmitting means;

FIGURE 2a is a fragmentary view of the clutch friction plate;

FIGURE 2b is an edge view of the structure of FIGURE 2a;

FIGURE 3 is an enlarged view taken substantially along line 3—3 of FIGURE 2;

FIGURE 4 is an enlarged fragmentary sectional view taken substantially along line 4—4 of FIGURE 2;

FIGURE 5 is an enlarged sectional view of a portion of the illustration of FIGURE 2 schematically showing certain portions in different operative positions; and FIGURE 6 is an end elevational view of FIGURE 5 showing the resilient means in an alternative operative position.

Turning now to the drawings (particularly FIGURE 2) there is illustrated a preferred embodiment of this invention, comprising in its broad aspects a friction means (clutch) A for selectively transmitting rotary power about an axis A-1 and having a cover plate assembly A-2 and a rigid housing A-3 forming part of an engine assembly; a manually operated means B (clutch pedal) is pivotally mounted upon a frame work forming part of a vehicle superstructure (not shown). A resilient engaging means C (coiled springs) is disposed internally within the clutch housing A-3 but slightly remote from the cover plate assembly A-2. A force transmitting means D is provided substantially within the clutch housing A-3 and employs a unitary reaction or rocker arm D-1 having a pivot about an axis D-2 which is closely adjacent the outer periphery of the cover plate assembly A-2 but off-set from the axis A-1 of the friction means. The force transmitting means D may further comprise a universally flexible linkage D-3 interconnecting the manual means with the rocker arm; other linkage D-4 having internal levers interconnects the cover plate assembly with the rocker arm D-1.

Turning now in more particularity to the components of the above clutch system or mechanism, the friction or clutch means A, the construction which may be generally of the type disclosed in U.S. Patent 3,167,163; (special features herein being improvements thereover and the disclosure thereof being incorporated herein) has a driving assembly comprising an annular flywheel or friction portion 21 adapted for rotation about the rotary movement axis A–1 by an input means 23; a sheet metal cover plate 24 is secured to the flywheel at peripheral flanges 24a and thereby defining an interior space 25. An annular pressure plate or element 26 is adapted for rotation with the cover plate by means of flexible, tangentially disposed, retraction straps 27 having an off-set configuration as described in Patent 3,167,163, wherein rotation of the cover plate is imparted to the pressure plate and a retraction tendency is residual in straps 27 even in the fully disengaged condition of the mechanism thereby aiding and assisting the disengaging effort. A rotary driven assembly 28 has an annular friction portion or driven plate 29 interposed between the flywheel 21 and pressure plate 26 and is drivingly connected to a driven shaft 30. The driven plate 29 comprises the usual hub 29a for driving connection to the shaft 30 and a conventional torsional damper 29b; and has an outer periphery upon which is mounted, in circumferentially spaced relation, a plurality of stamped sheet metal cushions or springs 34. The cushions in turn mount friction facings or rings 31 and 32 on opposite sides of plate 29 and are adapted for frictional gripping by the pressure plate and flywheel. The cushions may be arranged in relatively close relationship. Each of the cushions may be of a generally T-shaped configuration having an integral foot portion 35 with an outer flag portion 36 connected to the foot portion by a relatively narrow neck 37. The flag portion is given a convoluted shape 39 so that in its unstressed condition it has crown portions 38 adapted to be compressed into a generally flat shape 40 in the clutch engaged condition. The flexing or movement of the crown portions 38 into a generally flat condition will exert a reaction force R against the friction facings and in turn against the pressure plate; in the clutch engaged position the reaction force will be at a maximum.

The cover plate assembly A–2 (see FIGURE 5) comprises an internal lever actuation system including a plurality of radially arranged levers 42 each circumferentially spaced and each having their inner ends 42a interengaging a thrust bearing assembly 43 adaptable for sliding movement on the driven shaft 30. The levers 42 are each fulcrumed by means of a strut 44 interconnecting the outer end 42b of each lever with a coined seat 45 in the cover plate (a similar coined seat 46 is defined in the sheet metal lever 42 to receive the opposite edge of the strut). A rounded intermediate portion 42c of each of the levers is adapted to be interengaged with a generally flat or embossed surface 47 of the pressure plate for transmitting the engaging force S. The levers 42 when actuated by the thrust bearing 43 do not undergo solely a pivotal action but rather a compound movement wherein the rounded surface of the intermediate portion 42c rolls against the flat surface 47 of the pressure plate while the outer end 42b is free to undergo a slight arcuate movement as well as slight translatory movement. If the lever outer end 42b were restricted to a fixed pivot or fulcrum, there would be an accompanying scrubbing at the contact between the pressure plate and the intermediate portion 42c of the lever. A resilient U-shaped clip 48 is employed to retain the strut against fallout; clip 48 has leg 48a extending through an opening in the strut and a leg 48b extending through an opening 49 in the cover plate to conform to the exterior surface thereof.

A forked operating lever 50 is fulcrumed upon a strut 51 which extends between a coined seat 52 on the operating lever and a shoulder 53 on the clutch housing A–3. The forked inner end 50a (see FIGURE 6) of the operating lever engages spaced portions of the thrust bearing assembly 43 and has an outer end 50b adapted for actuation through the force transmitting means D. The operating lever also incorporates anti-friction characteristics wherein there are rolling or rocking contacts between the lever 50 and its contacting structure (note the rounded portions of the inner and outer ends 50a and 50b and the seat 52 receiving the strut 51). A retention spring 54 is employed adjacent the strut 51 of the operating lever to urge the inner end of the operating lever towards a position which would aid the effort of disengagement of the clutch.

The manually operated means B (see FIGURE 2) comprises a pivotal foot pedal or lever 55 carrying a foot pad 55a at one end and adapted to receive a manual actuating force; an opposite end 55b of the foot pedal is adapted for connection to the force transmitting means D. The pivot 56 for the foot pedal is defined by a sleeve 56a journalled in an opening formed in the lever; the sleeve in turn is journalled about a shaft 57 which may be carried by a part of the braking system of the vehicle (not shown) and which is supported by suitable mounting brackets fixed to a wall forming part of the frame of the vehicle (also not shown). The foot pedal 55 is maintained in a raised (clutch engaged) position, as shown in FIGURE 2, promoted by the reaction force R of the clutch plate cushions and the force of the engaging springs transmitted back through means D–3. Theoretically, the foot pedal of this system requires no independent resilient means to retain said retracted or raised position; however, a retention spring may be employed to prevent the lever from floating or bouncing beyond the preferred position. It should be noted that the spring will be connected between the foot pedal and a fixed bracket at the side of the pivot opposite from that normally employed in a vehicle today. The force applied by the foot pedal transmitted through a universally flexible linkage D–3 which forms part of the force transmitting D as will be described.

The resilient engaging means C comprises a pair of helically coiled tension springs 58 each having one end 58a hooked or connected to openings 59 provided in the clutch housing at an uppermost position as viewed in FIGURE 2. The other ends 58b of each of the springs have hooked portions which are connected to pins 60 extending and carried by the unitary pivotal arm D–1 of the force transmitting means. The springs are chordally disposed and form a V-shaped configuration (see FIGURE 6 or 1). The resultant engaging force has a direction which extends generally through or closely adjacent the axis A–1 of the friction device. The springs may thereby be positioned in a plane which is substantially close to the cover plate assembly and still within the trumpet shaped housing A–3.

The force transmitting means D has common rocker arm D–1 (lying in a plane perpendicular to axis A–1) formed of two-plys of sheet metal joined together at an intermediate portion 61 and having at one end 62 thereof spaced ears 62a each mounting pins 60 transverse to extent of each spring 58; each pin 60 has a head 60a. To each of the pins is attached the hooked portion 58b of the coiled tension spring, the hook portions having a specific flat 63 formed thereon so as to provide a straight edge or surface against which the rounded surface of the pins may roll during movement of arm D–1.

The opposite end 62b of the arm has the plys slightly spaced and through which is defined aligned openings 64 (see FIGURE 3) effective to receive a pin 65 journalled in openings 66 in bosses 67 of the housing A–3; pin 65 acts as the pivot for the rocker arm about the axis D–2; the bosses 67 are integrally formed on the trumpet shaped clutch housing adjacent a stepped rectangular opening 68 defined in the housing and through which the arm may extend for operable movement. A bracket 80 may be mounted on the housing to enclose the protruding portions of the transmitting means. The resilient means, manual means B, and clutching means A through which the reaction force of the cushions is promoted, have their forces carried by linkage connected at respective spaced locations along said arm in a specific geometric manner. Taking first, the connection of the reaction force R received from the clutching means, there is provided a link 69 having one end 69a rockably received within a curved seat 70 of the operating lever 50 and an opposite end having a D-shaped opening 71 through which is received a pin 72 carried at a radially innermost portion on arm D-1 (taken with respect to the rocker arm pivot). D-shaped opening 71 has the characteristic that one edge 72a thereof will be straight and against which the pin during the arcuate movement of the rocker arm may rollingly bear. The ends of the link are connected to the respective operating lever and rocker arm in a manner so that the general direction of the force R transmitted therealong is in a direction substantially parallel to the general axis A-1 of the cover plate assembly. Link 69 also is arranged so that it is slightly below the pivot axis D-2 and must continuously increase its moment arm $r$ as the rocker arm is progressively moved to the clutch disengaging condition. What is more critical is the fact that the moment arm $r$ is increasing as the clutch closely approaches the disengaged position whereby the normal drop-off in the reaction force from the cushions (because of the separation that takes place between the friction elements) is off-set. The moment arm will become a maximum $r'$ in the disengaged condition.

As indicated above, the resilient means C has hooked portions 58b connected directly to the rocker arm pins 60. The point of connection of the resilient means is at the radially outermost portion of a rocker arm (taken with respect to the pivot D-2). Since the resultant direction of resilient means force S is along a line generally perpendicular to the axis A-1 of the device, the arcuate movement of the rocker arm will inherently bring the resilient means closer to the pivot D-2 and thereby continuously decrease the moment arm $s$ to $s'$. The effectiveness of the resilient means is gradually reduced as the disengaged position is promoted; this aids the effort applied by the operator of the clutch pedal.

That portion D-3 of the force transmitting means which connects the manual clutch pedal with the common reactor arm D-1 comprises a central strand 73 which is universal in its ability to flex while still transmitting longitudinal forces; the strand is housed within a casing assembly 74 including a conduit having polyvinyl outer cover in a low friction inner liner comprised of such materials as teflon, polyethylene (not shown). Casing assembly 74 has one terminal end 74a secured by a ferrule 75 to a flange 76 of a clutch housing which in turn is fixed. That portion of the strand which extends through ferrule 75 carries a connector 96 having a shank 96a which is swaged to the strand; the connector also has a bladed portion 96b provided with an oblong or D-shaped opening 77 defining a straight edge against which a pin 78 (received in the opening 77) may rollingly bear. Pin 78 is carried at an intermediate portion of the rocker arm D-1 as shown in FIGURE 4.

To achieve a soft pedal effort the geometrical disposition of the forces acting on the common rocker plate is critical. For analysis, it is well to speak in terms of the moments (tendency of a force to rotate the body on which it acts about a central axis, a moment being represented by the force multiplied by distance with a particular direction) of such forces about the pivot axis D-2. It is well known that for a static body the sum of moments about a point equals zero. Thus, it can be seen that the moment of the pedal force will always be equal to the difference between the resilient spring moment and the clutch reactor moment. The change of moment arms of the respective forces is particularly shown in FIGURE 5 wherein the moment arm $r$ (representing the clutch reaction force arm transmitted through the link 69) and which will continuously increase to a maximum $r'$. Although the relative disposition of the pivot axis D-2 may be transposed to an opposite side of the operating fork, the choice of planes within which the resilient means force and the cushion reaction force may be directed to the arm D-1 is substantially limited in order to provide a compactness of this invention. The concentration of the various forces to a common reaction arm permits the pedal effort to be more easily changed to fit customer desires.

Link 69 (see FIGURE 5) may integrally comprise a slack compensator to automatically adjust for wear that takes place between the friction elements and thereby maintain the geometry of the system at peak performance. The compensating means comprises a pair of interscrewed members 86 and 87; the inner member 87 has helical threads 87a formed on the exterior thereof with one end thereof having a rounded nose to engage the operating lever 50. The other member 86 acts as a threaded socket. A helically coiled spring 88 is wrapped around the member 87 and has one end or strand 88a (see FIGURE 6) extending transversely outwardly therefrom to be actuated in a rotative manner about the axis 89 of the link 69. Spaced fingers 90 and 91 are carried by arm D-1 and are arranged not to engage the strands 88a during a normal clutch disengagement stroke without wear. Finger 91 may comprise one portion of ear 62a of arm D-1. Upon the occurrence of a degree of wear, finger 90 will urge the spring to turn about member 87 in an unloosened manner. Thence, upon disengagement finger 91 will turn the spring in an opposite direction but tightly so as to screw member 87 out of the socket member 86 and thereby adjust link 69 to compensate for wear.

While I have described my invention in connection with one specific embodiment and other alternative suggestions thereof, it is understood that this is by way of illustration and not by way of limitation and the scope of my invention is defined solely by the appended claims which should be construed as broadly as the prior art will permit.

What is claimed is:

1. For use in a clutch system having an axis and operable between clutch engaging and clutch disengaging conditions and employing clutching means having interengageable friction elements with at least one element having a friction facing carried by resilient cushions thereon, said cushions being adapted to be substantially flexed when said portions are fully interengaged thereby exerting a maximum reaction force upon the other of said elements tending to urge the elements apart, said system further having resilient means extending transverse to said clutch system axis and closely adjacent said elements, manually operated means for overcoming the effect of said resilient means, and linkage for interconnecting said manual, clutching, and resilient means respectively, to novel combination comprising: a rockable bracket pivotally mounted upon an axis spaced closely adjacent the outer periphery of said elements and transverse to said clutch system axis, and links respectively connecting each of said manual, clutch, and resilient means to predetermined spaced portions of said arm whereby the geometrical moment arms described by the connected relationship will permit the link connected to the clutching means to compensate for the loss of turning moment of the cushion reaction force with respect to said pivot as said system closely approaches the clutch disengaging condition.

2. A friction mechanism having a first axis comprising: rotatable annular elements having at least one element thereof adapted for axial movement to promote interengagement thereof, a rotary driven plate interposed between said elements and carrying a friction facing supported by resilient cushions on said plate, said cushions being adapted to be flexed as said elements exert a clamping pressure upon said driven plate and thereby provide a reaction force tending to urge said elements apart, resilient means normally urging said one movable element toward interengagement, said resilient means being effective to exert a resultant force generally perpendicular to said first axis while being closely adjacent to said movable pressure element, manually operated means movable between a position for engaging said elements to a position for disengaging said elements, and force transmitting means interconnecting said manual means with with resilient means and clutch means about a common pivot, that portion of the transmitting means connecting the clutch means to said pivot being characterized by a plurality of levers having rockable or rollable contacts throughout and at least one terminal link of said portion being connected to said common pivot which is effective to transmit a force therethrough generally parallel to said first axis, said common pivot being particularly comprised of a sheet metal rocker arm to which is connected said manual means, resilient means, and clutch means by way of other portion of said force transmitting means, said sheet metal rocker arm is generally elongated and has along the extent thereof three general points of connection for said respective manual means, resilient means, and clutch means by way of said other portions of said force transmitting means, the connection of said resilient means to said rocker arm being at an outermost portion of said arm with respect to its pivot and the connection of said clutch means to said rocker arm being at a radially innermost portion of said arm with respect to its pivot.

3. A friction mechanism as in claim 2, in which the connections of said other portions of said force transmitting means to said sheet metal rocker arm are particularly characterized in that an opening is disposed in said force transmitting means and a pin is carried by said rocker arm, said pin extneding through said openings and said opening having at least one straight edge against which said pin may rollingly bear as said rocker arm is arcuately moved during its operative actuation.

4. A friction mechanism as in claim 3, in which resilient means comprises a plurality of elongated springs extending transversely with respect to said first axis, said springs each having one end operably connected to said rocker arm, said rocker arm being characterized by a plurality of plys of sheet metal with ears extending from each ply for reception of a spring connection.

References Cited

UNITED STATES PATENTS

| | | | |
|---|---|---|---|
| 1,571,746 | 2/1926 | Wemp | 192—68 |
| 1,607,215 | 11/1926 | Spase | 192—68 |
| 1,927,643 | 9/1933 | Hughes | 192—99 |
| 2,239,968 | 4/1941 | Meech | 192—68 |
| 2,441,140 | 5/1948 | Fishburn | 192—68 |
| 2,818,952 | 1/1958 | Ross | 192—99 |
| 3,162,286 | 12/1964 | Smith et al. | 192—68 |
| 3,167,163 | 1/1965 | Smirl et al. | 192—68 |

MARK NEWMAN, *Primary Examiner.*

ARTHUR T. McKEON, *Examiner.*